United States Patent
Tanaka et al.

(10) Patent No.: US 6,347,220 B1
(45) Date of Patent: Feb. 12, 2002

(54) MULTIPLE-BEAM ANTENNA SYSTEM OF WIRELESS BASE STATION

(75) Inventors: Yoshinori Tanaka; Shuji Kobayakawa; Masafumi Tsutsui, all of Kawaski (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/143,679

(22) Filed: Aug. 31, 1998

(30) Foreign Application Priority Data

Mar. 18, 1998 (JP) .......................................... 10-068524

(51) Int. Cl.$^7$ ............................................. H04B 17/00
(52) U.S. Cl. ..................... 455/277.2; 455/134; 455/135; 370/320
(58) Field of Search .................................. 455/561, 562, 455/277.1, 279.1, 277.2, 278.1, 226.1, 525, 522, 450, 62, 69, 134, 135, 136, 486, 437, 441; 370/310, 320

(56) References Cited

U.S. PATENT DOCUMENTS

| | | | | |
|---|---|---|---|---|
| 5,095,535 A | * | 3/1992 | Freeburg ................. | 455/278.1 |
| 5,444,862 A | * | 8/1995 | Hibino ...................... | 455/54.1 |
| 5,590,399 A | * | 12/1996 | Matsumoto et al. ....... | 455/33.3 |
| 5,898,682 A | * | 4/1999 | Kanai .......................... | 370/331 |
| 5,960,350 A | * | 9/1999 | Schorman et al. ........... | 455/450 |
| 5,983,113 A | * | 11/1999 | Asanuma .................... | 455/506 |
| 6,026,279 A | * | 2/2000 | Nakamura et al. ............ | 455/69 |
| 6,044,067 A | * | 3/2000 | Suzuki ........................ | 370/252 |
| 6,112,093 A | * | 8/2000 | Nordlund .................... | 455/450 |
| 5,974,106 A | * | 9/2000 | Dupont et al. ............... | 375/377 |
| 6,115,614 A | * | 9/2000 | Furukawa .................... | 455/525 |
| 6,119,018 A | * | 9/2000 | Kondo ........................ | 455/522 |
| 6,141,335 A | * | 10/2000 | Kuwahara et al. .......... | 370/342 |
| 6,167,286 A | * | 12/2000 | Ward et al. .................. | 455/562 |

FOREIGN PATENT DOCUMENTS

| | | |
|---|---|---|
| EP | 0777400 | 6/1997 |
| WO | 96/37973 | 11/1996 |

* cited by examiner

Primary Examiner—William Trost
Assistant Examiner—Conguan Tran
(74) Attorney, Agent, or Firm—Rosenman & Colin LLP

(57) ABSTRACT

In a CDMA wireless base station, signals that have been received by a plurality antenna elements of an array antenna on the receiving side are subjected to beam forming by a reception beam former to electrically form a plurality of uplink beams. Reception is carried out based upon the optimum beam (e.g., the beam for which the power is maximum) among the plurality of uplink beams. A transmission beam former for subjecting a transmission signal to beam forming is provided. Based upon whether an uplink reception signal is present or not, a controller performs control so as to carry out downlink beam forming, thereby forming a downlink transmission beam in a direction identical with that of the optimum uplink reception beam, or in such a manner that downlink beam forming is not carried out.

12 Claims, 13 Drawing Sheets

MULTIPLE-BEAM ANTENNA SYSTEM OF WIRELESS BASE STATION

BACKGROUND OF THE INVENTION

This invention relates to a wireless base station multiple-beam antenna system in DS-CDMA wireless communications. More particularly, the invention relates to a multiple-beam antenna system having an uplink beam forming function for performing reception upon applying uplink beam forming to signals that have been received by a plurality of antenna elements, and a downlink beam forming function for applying downlink beam forming to transmission signals in order to form a transmission beam in a prescribed direction.

Digital cellular wireless communication systems using DS-CDMA (Direct Sequence Code Division Multiple Access) technology have been developed as next-generation mobile communications systems for implementing wireless multimedia communication. In a communications system using DS-CDMA, interference between users is the main cause of a decline in channel capacity and transmission quality of cells. Research and development in regard to multiple-beam antennas and adaptive array antennas is being carried out in an effort to discover techniques for reducing such interference and improving transmission quality.

As shown in FIG. 10, a multiple-beam antenna performs reception using an array antenna AAT consisting of a plurality of element antennas $AT_1$–$AT_N$, and applies beam forming to antenna output signals by means of a beam former BMF to electrically form multiple beams $B_1$–$B_M$ of prescribed directivity. Each beam of the multiple-beam antenna possesses a directivity pattern of the kind shown in FIG. 11. Accordingly, radio waves emitted from an ith user (mobile station) residing in the directivity direction of beam 2, for example, are received by the array antenna AAT and the beam former BMF outputs the beams $B_1$–$B_M$. The power of beam $B_2$, however, is greater than that of the other beams $B_1$, $B_3$–$B_M$. Data is subsequently demodulated by performing despreading using the beam $B_2$. Thus, in accordance with a multiple-beam antenna, reception is performed upon selecting the optimum beam on a per-user (channel) basis, whereby there are obtained such effects as a reduction in interference between channels, an improvement in reception SN ratio owing to a higher antenna gain and a reduction in terminal transmission power.

The foregoing relates to a reception beam former which electrically forms the plurality of uplink reception beams $B_1$–$B_M$ by applying uplink reception beam forming to the signals received by the plurality of antenna elements $AT_1$–$AT_N$ of the array antenna AAT. However, a transmission beam former can be provided as well. More specifically, it is possible to provide a transmission beam former in such a manner that downlink transmission beam forming is applied to transmission signals to generate antenna element input signals and the signals are input to individual antenna elements, whereby beams having directivities in prescribed directions are output from the antenna.

FIG. 12 is a diagram showing the construction of a wireless base station using a transceiving multiple-beam antenna. An array antenna $AAT_1$ on the receiving side has a plurality of antenna elements $ATR_1$–$ATR_N$. An array antenna $AAT_2$ on the transmitting side has a plurality of antenna elements $ATT_1$–$ATT_N$. A reception beam former RBF electrically forms M-number of uplink reception beams $B_1$–$B_M$ by applying uplink reception beam forming to signals that have been received by the N-number of antenna elements $ATR_1$–$ATR_N$. Channel receivers $CHR_1$–$CHR_K$ are provided for respective channels (users or mobile units) and are equipped with despreading circuits, synchronous detection circuits and data identification circuits, etc. The output signals of the reception beam former RBF enter each of the channel receivers $CHR_1$–$CHR_K$. Channel transmitters $CHT_1$–$CHT_K$ are provided for respective channels and are equipped with spreading circuits and quadrature modulation circuits, etc. Transmission data on respective channels enter respective ones of the channel transmitters $CHT_1$–$CHT_K$. A transmission beam former TBF generates antenna element input signals by applying downlink transmission beam forming to transmission signals (transmission beams) output from the channel transmitters.

As illustrated in FIG. 13, the reception beam former RBF multiplies output signals $x_1$–$x_N$ of the respective antenna elements by weights $W_{k,i}$ to thereby implement phase rotation, and sums the products to electrically form M-number of uplink reception beams 1–M each having a prescribed directivity. If $x_k(nT_c)$ represents the reception signals of N-number of antenna elements and $W_{k,i}$ represents a conversion coefficient of the beam former, then a signal $y_i(nT_c)$ of an ith beam (i=1–M) will be expressed by the following:

$$y_i(nT_c) = \Sigma W_{k,i} \cdot x_k(nT_c) \quad (k=1-N) \tag{1}$$

The direction (directivity) of each of the M beams can be applied to the array antenna by deciding the conversion coefficient $W_{k,i}$. As a result, a transmission signal from a user (mobile station) in a prescribed ith directivity direction can be obtained from a terminal, e.g., the ith terminal, that corresponds to the ith directivity direction of the reception beam former RBF.

As illustrated in FIG. 14, the transmission beam former TBF splits a transmission signal (transmission beam) $y_i$ that enters an ith input terminal into N branches and multiplies each branch signal $Y_i$ by the weight $W_{k,i}$ (k=1–N) to implement phase rotation and generate a signal $x_k$ (k=1–N) that is input to a respective one of the N transmitting antennas. In this case, $x_k$ is represented by the following:

$$x_k = W_{k,i} \cdot y_i \tag{2}$$

The direction (directivity) of each of the M beams can be applied to the array antenna by deciding the conversion coefficient $W_{k,i}$. As a result, if it is desired to make a transmission to a user (mobile station) in an ith transmission beam direction, the transmission signal $y_i$ should be input to the ith input terminal of the transmission beam former TBF.

Thus, multiple beams produced by the reception beam former RBF and multiple beams produced by the transmission beam former TBF are made to coincide. Consequently, in order to communicate with a user (mobile station) in the ith beam direction, it will suffice to despread the beam output by the ith output terminal of the reception beam former RBF and demodulate the data. In order to transmit data, it will suffice to input the transmission signal to the ith input terminal of the transmission beam former TBF. More specifically, reception signals $x_i(nT_c)$ (i=1–N) from N-number of antenna elements $ATR_1$–$ATR_N$ are amplified, detected and subjected to an A/D conversion by means that are not shown. The reception beam former RBF then digitally forms M-number of beams. That is, the reception beam former RBF obtains the signal $y_i(nT_c)$ of each beam through the conversion expressed by Equation (1). Next, the reception beam former RBF performs despreading on a perchannel basis in regard to the plurality of beams formed and carries out uplink reception upon selecting the beam for which signal power after despreading is largest or the beam for which the correlation power between a pilot signal after despreading and a reference signal is largest. In case of downlink transmission, a transmission signal is input to the ith input terminal of the transmission beam former TBF in such a manner that the direction obtained will be the same as that of the beam that was selected at the time of uplink reception. As a result, the transmission array antenna $AAT_2$ radiates the transmission signal toward the user (mobile station) in the ith beam direction.

FIG. 15 shows another example of a beam former. This is a diagram showing the construction of the well-known Butler matrix (in the case of an 8-beam antenna). FIG. 16 is a diagram useful in describing multiple beams formed by the Butler matrix.

The transmission beam former TBF in FIG. 15 is obtained by combining hybrid circuits, each of which has two input terminals and two output terminals, and phase shifters for delaying phase by a predetermined amount. Input terminals 1R–4R, 1L–4L are connected to all radiating elements $ATT_1$–$ATT_8$ (#1–#8). This transmission beam former TBF includes hybrid circuits HYB the output terminals A and B of which provide equal power, with the phase of output terminal B lagging that of output terminal A by $\pi/2$ (=90°). The encircled numerals indicate the phase shifters; if the numeral is m, then the phase shift is $m\pi/8$. For example, if a signal enters a hybrid circuit HYB from the terminal 1R, the output terminals A, B deliver equal power but the phase is delayed by 90° ($\pi/2$) at terminal B.

In FIG. 15, amounts of phase shift at the #1–#8 antenna elements are calculated with respect to an input signal from the input terminal 1R. The amount of phase shift of a connection cable, however, may be considered negligible. Phase is $5\pi/8$ at antenna element #1, $6\pi/8$ at antenna element #2, $7\pi/8$ at antenna element #3, $8\pi/8$ at antenna element #4, $9\pi/8$ at antenna element #5, $10\pi/8$ at antenna element #6, $11\pi/8$ at antenna element #7 and $12\pi/8$ at antenna element #8. Feed is carried out with phase being delayed in increments of $\pi/8$ from antenna element #1 to antenna element #8.

When the position of the terminal to which the input signal is fed changes in FIG. 15, the phase difference that develops between the radiating elements grows larger and a beam is formed in a direction that is significantly offset from the front side of the array. If we let $\Delta\Psi$ represent the phase difference between radiating elements and d the element spacing, then beam direction $\theta$ will be expressed as follows:

$$d \cdot \sin \theta / \lambda = \Delta\Psi / 2\pi \quad (3)$$

In case of an input from the aforementioned input terminal 1R, we would have $\sin \theta = 1/8$, or $\theta \approx 7.2°$, if $\Delta\Psi = \pi/8$ and $d = \lambda/2$ hold. The result is that a beam is formed in the direction of 1R in FIG. 16. Further, since $\Delta\Psi = 7\pi/8$ holds in regard to an input from the input terminal 4R, in this case we have $\sin \theta = 7/8$, $\theta \approx 61°$.

In mobile communications, there is not only a communication mode in which information is transmitted continuously, as in the case of voice communication, but also a communication mode in which transmission is bursty, as in the communication of data in the form of packets. When there is no information to be transmitted in packet communication, the usual practice is to transmit nothing in order to reduce interference with respect to other stations. In a wireless base station, there are cases where there is an uplink reception signal but no downlink transmission signal with regard to a certain channel (mobile station). Since the wireless base station does not receive an uplink signal from the mobile station in such cases, in which beam area the mobile station is currently situated is unknown and it is not possible to decide the directivity direction of the downlink transmission beam. In other words, downlink beam forming cannot be carried out in such cases. Accordingly, the conventional practice is to perform beam forming only for uplink reception and not for downlink transmission taking into account the mode in which data is transmitted in bursts.

FIG. 17 is a block diagram showing the construction (in the case of four beams) of a prior-art channel transceiver which performs only uplink beam forming. The apparatus includes the reception array antenna $AAT_1$, which has antenna elements $ATR_1$–$ATR_4$, the reception beam former RBF, the transmitting antenna $AAT_2$, and a transceiver channel unit $RT_i$ of an ith channel having a channel receiver $CHR_i$ of the ith channel and a channel transmitter $CHT_i$ of the ith channel. Though not illustrated, receiver circuitry for performing a frequency conversion, detection and an A/D conversion is provided in front of the reception beam former RBF in the receiving system. Further, though not illustrated, a transmission unit for performing a D/A conversion, frequency conversion and amplification is provided in front of the transmitting antenna in the transmission system.

The channel receiver $CHR_i$ includes despreading circuits $1_1$–$1_4$ for applying despread processing to beams 1–4, which are output by the reception beam former RBF, using a spreading code that has been allocated to the channel; a selector 2 for selecting the optimum beam (despread signal); a selection controller 3 for deciding the beam for which signal power is maximum or the beam for which the cross-correlation power between a reception pilot signal and a reference signal is maximum, and for so notifying the selector 2; a synchronous detector 4 for subjecting the despread signal selected by the selector 2 to synchronous detection; an error corrector 5 for performing an error correction using an error correction code appended on the transmitting side; and a data identification unit 6 for identifying received data. The channel transmitter $CHT_i$ includes an error correction coder 7 for adding an error correction code onto transmission data, a modulator 8 such as a QPSK quadrature modulator, and a spread-spectrum modulator 9 for spreading and outputting transmission data using the spreading code allocated to the mobile station (channel).

In accordance with this transceiver channel unit, beam forming is performed only for uplink reception and not for downlink transmission.

Thus, with the conventional wireless base station, transmission beam forming is not applied even in an ordinary communication mode in which transmission is not bursty. Consequently, downlink beam forming is not applied also in a case where an uplink signal is present. As a result, interference between channels at the time of downlink communication cannot be reduced, reception SN ratio cannot be improved and it is not possible to reduce terminal transmission power.

SUMMARY OF THE INVENTION

Accordingly, an object of the present invention is to so arrange it that downlink beam forming can be carried out in a case where an uplink reception signal exists.

Another object of the present invention is to so arrange it that downlink beam forming at a base station can be performed at all times regardless of whether there is uplink transmission information.

In accordance with the present invention, the foregoing objects are attained by providing a multiple-beam antenna system of a wireless base station in CDMA mobile communications comprising (1) a reception beam former for electrically forming a plurality of uplink reception beams by applying uplink beam forming to signals received by a plurality of antenna elements of an antenna array; (2) a reception data identification unit for executing reception data identification processing based upon an optimum beam among the plurality of uplink reception beams; (3) a transmission beam former for generating antenna element input signals by applying downlink beam forming, which is for beam formation in a prescribed direction, to transmission signals; and (4) means for controlling whether downlink beam forming, which is for forming a downlink transmission beam in a direction identical with that of the optimum uplink reception beam, is performed or not.

Other features and advantages of the present invention will be apparent from the following description taken in conjunction with the accompanying drawings.

DESCRIPTION OF THE PREFERRED EMBODIMENTS

(A) Overview of the Invention

Figure 1:
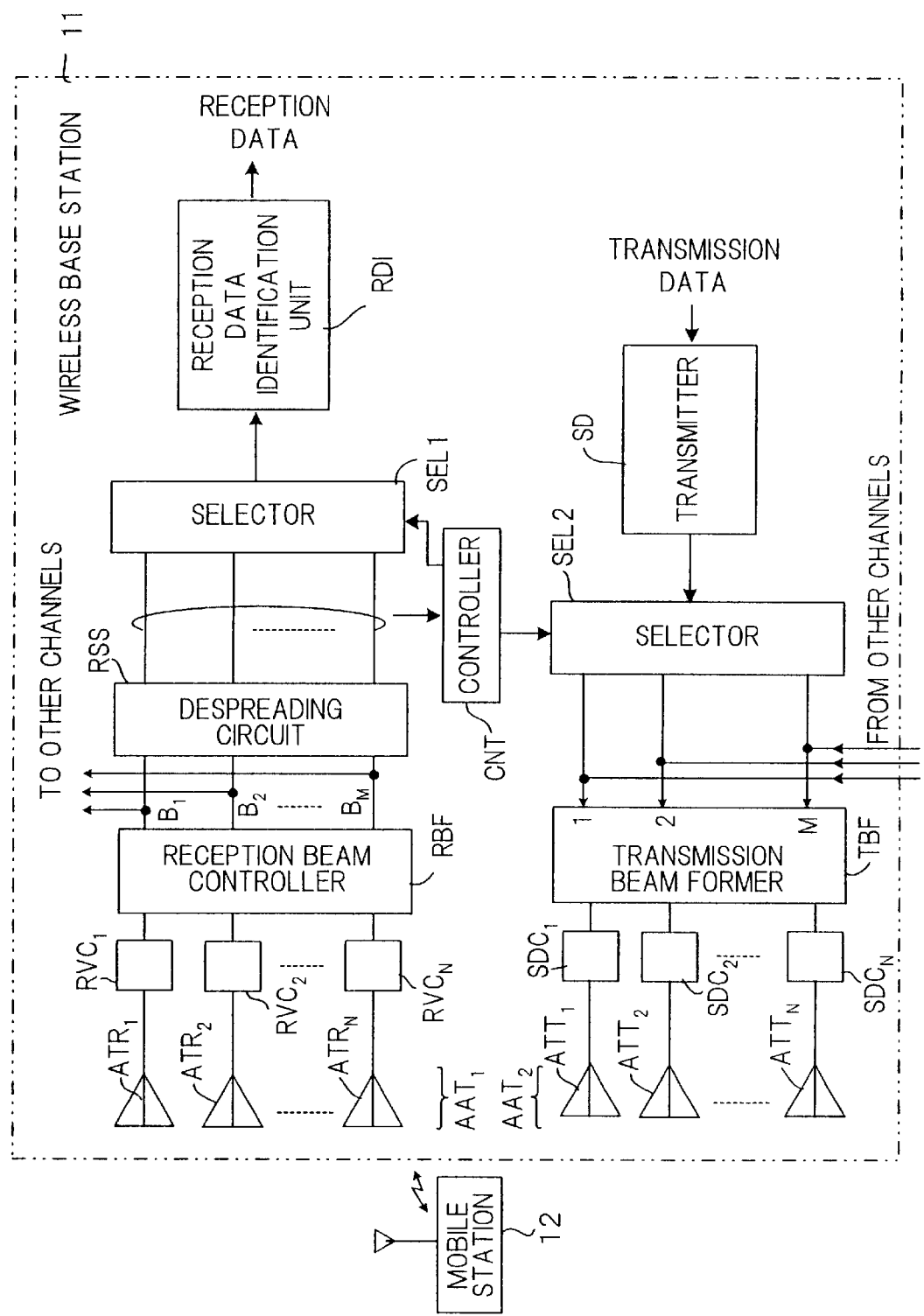
FIG. 1 is a diagram useful in describing the principles of the present invention.

FIG. 1 is a diagram useful in describing an overview of the present invention.

Shown in FIG. 1 are a CDMA wireless base station 11 and a mobile station 12. The wireless base station 11 communicates with the mobile station 12 while allocating the spreading code of a prescribed channel to the mobile station. The wireless base station 11 includes the array antenna $AAT_1$ on the receiving side having the plurality of antenna elements $ATR_1$–$ATR_N$; the array antenna $AAT_2$ on the transmitting side having the plurality of antenna elements $ATT_1$–$ATT_N$; receiving circuits $RVC_1$–$RVC_N$ for performing high-frequency amplification, frequency conversion and quadrature detection of received signals; transmitting circuits $SDC_1$–$SDC_N$ for performing frequency conversion and high-frequency amplification; the reception beam former RBF for electrically forming M-number of uplink reception beams $B_1$–$B_M$ by applying uplink reception beam forming to signals that have been received by N-number of the antenna elements $ATR_1$–$ATR_N$; and the transmission beam former TBF for generating antenna element input signals by applying downlink transmission beam forming to transmission signals. By applying these input signals to the antenna elements, it is possible to output a transmission beam having directivity in a prescribed direction.

The wireless base station 11 further includes a controller CNT for detecting the presence of an uplink reception signal. If an uplink reception signal is present, the controller CNT performs control in such a manner that a downlink transmission beam having a direction the same as that of the uplink reception signal is formed. If an uplink reception signal does not appear upon elapse of a fixed period of time, the controller CNT performs control in such a manner that downlink beam forming is not carried out. The wireless base station 11 further includes a despreading circuit RSS, a selector SEL1 for selecting a despread signal of maximum power, a reception data identification unit RDI for subjecting the selector output to synchronous detection, error correction processing and data identification processing and outputting the reception data, a transmitter SD for subjecting transmission data to QPSK quadrature modulation, spread-spectrum modulation, etc., and a selector SEL2 for inputting a transmission signal to a prescribed input terminal of the transmission beam former TBF in accordance with an indication from the controller CNT.

The array antennas $AAT_1$, $AAT_2$ and the beam formers RBF, TBF are shared by each of the channels. The output terminals of the reception beam former RBF are connected to each of the channel receivers (not shown), and the input terminals of the transmission beam former TBF are connected to each of the channel transmitters (not shown).

According to the present invention, whether or not downlink beam forming is carried out is selected dynamically based upon the presence of an uplink reception signal. That is, in each communication channel, the controller CNT checks to determine whether an uplink reception signal is present. If the signal is present, the controller CNT performs control in such a manner that downlink beam forming of the corresponding channel is carried out. On the other hand, if an uplink reception signal stops arriving and there is no uplink reception signal upon elapse of a fixed period of time, the controller CNT performs control in such a manner that downlink beam forming is not carried out. More specifically, the transmission beam former TBF has a plurality of input terminals corresponding to transmission beam directions. In a case where downlink beam forming is carried out, the controller CNT inputs the transmission signal to the input terminal of the transmission beam former TBF that corresponds to the uplink reception beam direction. In a case where non-directional transmission is performed without carrying out downlink beam forming, the controller CNT causes the transmission signal to branch into a plurality of signals inputs the branched signals to the respective input terminals of the transmission beam former TBF If this arrangement is adopted, downlink transmission beam forming may be turned on and off in dependence upon the absence or presence of an uplink reception signal. Accordingly, downlink beam forming is carried out in a case where an uplink signal is present, even at the time of a bursty data transmission such as a packet transmission. This makes it possible to improve downlink transmission quality.

Further, in a case where a transmission signal is caused to branch into n signals and the branched signals are input to the input terminals of the transmission beam former so that downlink beam forming is not carried out, the transmission power of each branched signal is made $\alpha/n$ (where $\alpha > 1$), namely greater than $1/n$ of transmission signal power. Though downlink transmission quality declines if downlink beam forming is not carried out, the decline can be compensated for by increasing downlink transmission power to a certain extent. If the transmission power of a certain channel is increased, however, the interference imposed upon other channels increases as well. There is a limit, therefore, upon the amount by which power can be increased.

Further, reception data is demodulated using a despread signal that corresponds to the uplink reception beam of maximum power among the plurality of uplink reception beams output by the reception beam former RBF. If this arrangement is adopted, channel interference can be reduced, thereby making it possible to achieve communication having excellent transmission quality. In addition, the directivity direction of the downlink transmission beam of each channel is made the same as that of the uplink reception beam for which the reception signal power of the channel is largest. Such an arrangement makes it possible to improve transmission quality by reducing channel interference in both uplink and downlink channels.

Further, even if uplink transmission information is absent on the side of the mobile station 12, a pilot signal is transmitted at fixed time intervals. As a l;result, the wireless base station 11 is capable of improving downlink transmission quality by performing downlink transmission beam forming regardless of the absence or presence of uplink transmission information. In this case the pilot signal transmission interval of the mobile station 12 is varied in dependence upon the traveling velocity of the mobile station. If the mobile station is at rest or traveling at low velocity, therefore, the frequency of uplink pilot signal transmission can be kept low.

Further, if a decline in transmission quality of a downlink reception signal is sensed while an uplink transmission is not being performed, the mobile station 12 transmits an uplink pilot signal. As a result, the wireless base station 11 is capable of improving downlink transmission quality and of restoring downlink reception quality by performing downlink transmission beam forming regardless of the absence or presence of uplink transmission information. In addition, the mobile station 12 can transmit the pilot signals less frequently.

(B) First Embodiment
(a) Construction of Wireless Base Station

Figure 2:
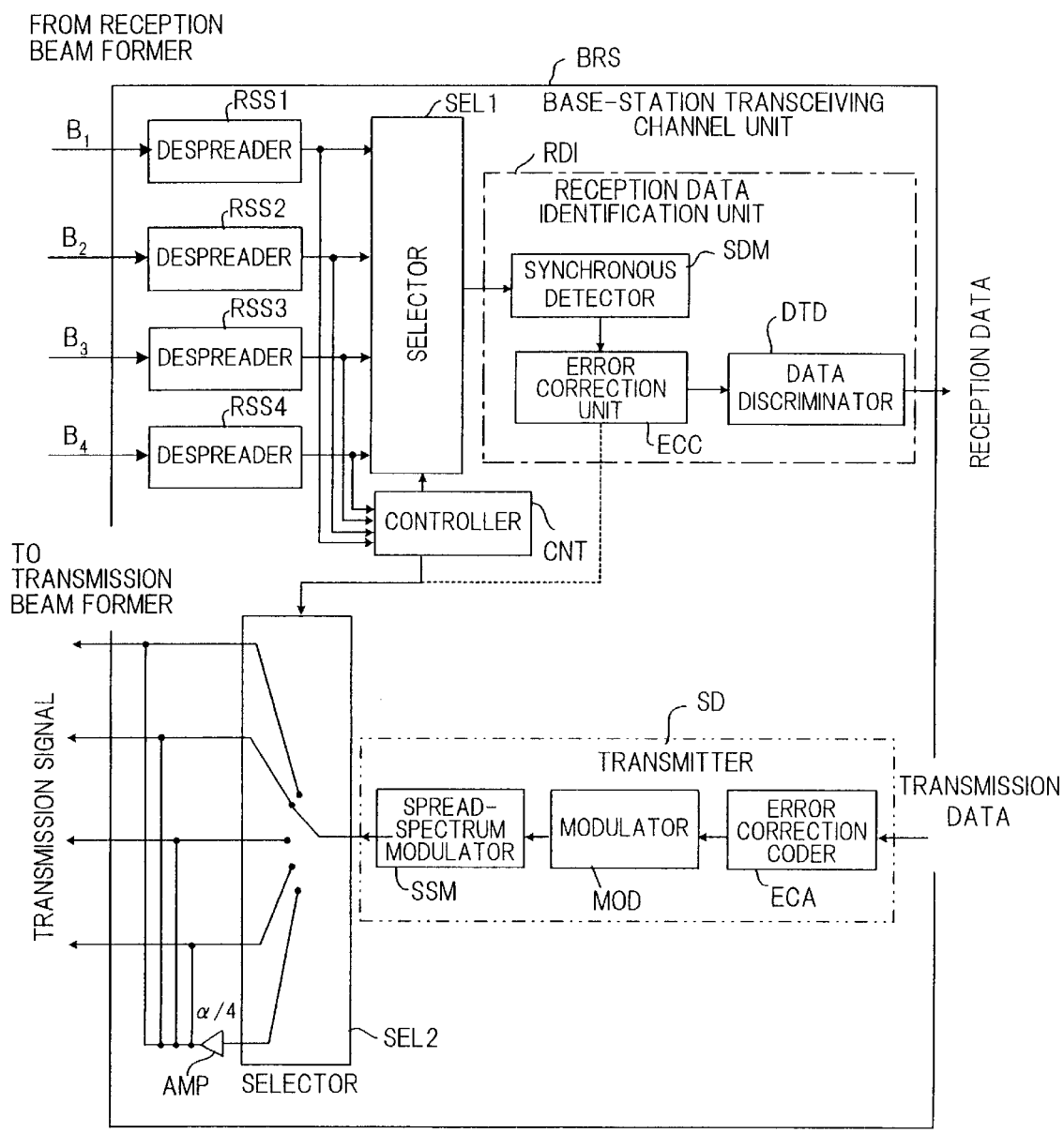
FIG. 2 is a block diagram illustrating the construction of a base-station transceiver channel unit according to a first embodiment to which the present invention has been applied.

FIG. 2 is a block diagram illustrating the configuration of the inventive multiple-beam antenna system for a wireless base station. Components identical with those shown in FIG. 1 are designated by like reference characters. It should be noted that only one transceiving channel unit BRS is illustrated in FIG. 2, the array antenna $AAT_1$ and reception beam former RBF shown in FIG. 1 are provided on the receiving side, and the reception beam former outputs $B_1$–$B_4$ are input to the despreading units of FIG. 2. Further, the array antenna ATT2 and transmission beam former TBF shown in FIG. 1 are provided on the transmitting side, and the transmission signals of FIG. 2 are input to the prescribed input terminals of the transmission beam former TBF.

The base-station transceiving channel unit BRS includes despreading circuits RSS1–RSS4 the inputs to which are the four uplink reception beams $B_1$–$B_4$ output by the reception beam former RBF. The despreading circuits RSS1–RSS4 apply despreading processing to each of the beams $B_1$–$B_4$ using a despreading code allocated to the channel and output despread signals (I, Q signals). The selection controller CNT executes (1) processing for sensing the signal of maximum power among the four despread signals, (2) processing for sensing whether an uplink signal is present or not, and (3) beam selection control and downlink beam forming on/off control based upon the results of the sensing processing. The selector $SEL_1$ selects the beam (despread signal) of maximum power of which notification has been given by the selection controller CNT and outputs the selected signal to the reception data identification unit RDI. The reception data identification unit RDI includes a synchronous detector SDM to which despread signals (I, Q signals) are applied for performing synchronous detection, an error corrector ECC for applying error correction processing to demodulated reception data, and a data discriminator DTD.

Figure 3:
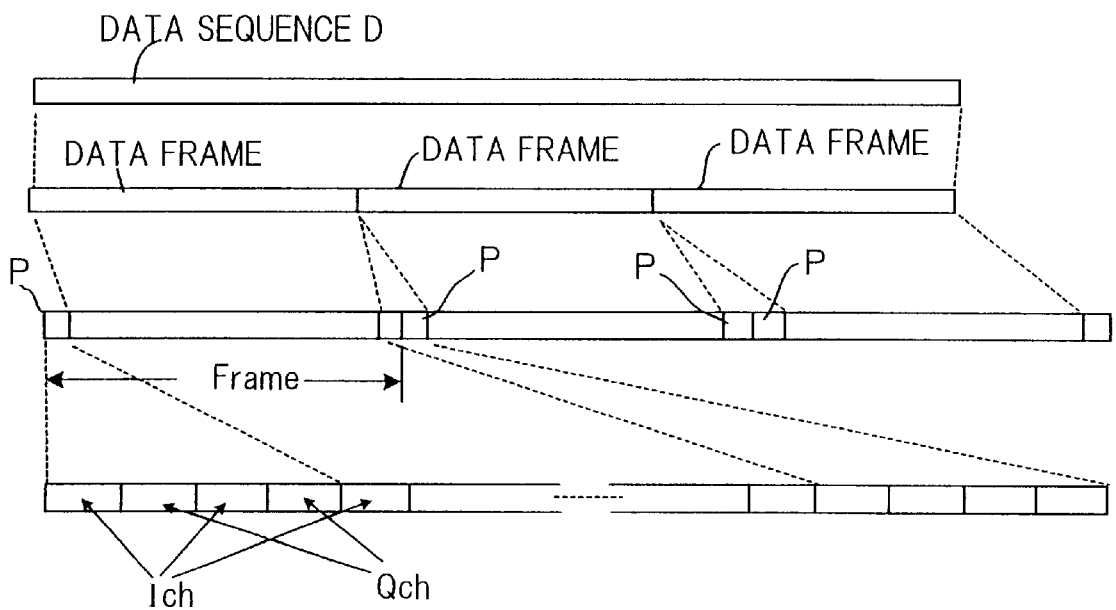
FIG. 3 is a diagram useful in describing a frame.
Figure 4:
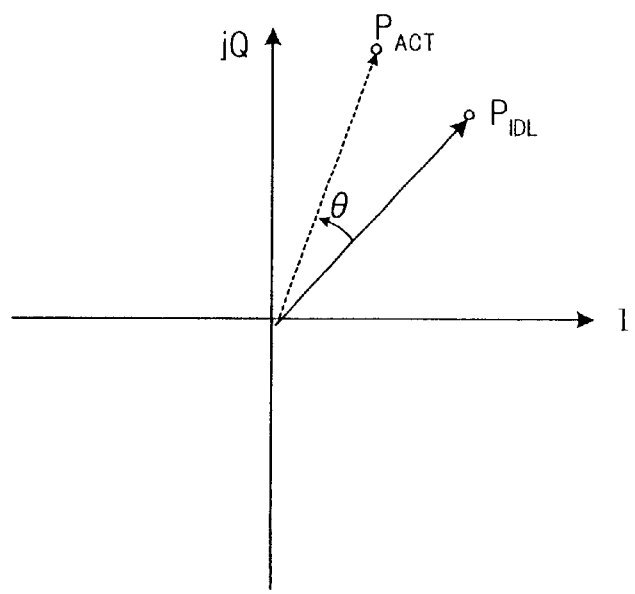
FIG. 4 is a diagram useful in describing phase rotation of a pilot symbol.

The synchronous detector SDM detects a pilot signal, obtains the phase difference between this pilot signal and an already known pilot signal and restores the phases of the despread I, Q signals by the amount of this phase difference. In order to perform highly precise data demodulation in CDMA communication, a pilot signal is inserted every prescribed number of items of data. More specifically, as shown in FIG. 3, the mobile station 12 forms transmission data D into blocks every prescribed number of bits, inserts already known pilot signals before and after the blocks to form frames, then converts the frame data sequence to I, Q data sequences, subjects these to QPSK modulation and spread-spectrum modulation and transmits the results. The data and pilot each form one symbol composed of the two bits of I, Q, and the symbol is $I+jQ=(I^2+Q^2)^{1/2}\exp(j\theta)$ when expressed in the I-Q complex plane. The data symbol and the pilot symbol experience phase rotation owing to transmission. If a signal point position vector PACT (see FIG. 4) is known at the wireless base station 11, then the phase rotation angle $\theta$ of the symbol resulting from transmission can be obtained because the ideal signal point position vector PIDL of the pilot symbol is already known. Accordingly, the synchronous detector SDM detects the pilot symbol, calculates the phase rotation angle $\theta$ thereof, subjects each data symbol to rotation processing equivalent to the rotation angle $-\theta$ to thereby effect restoration to the original and discriminates the "1", "0" of the reception data. As a result, highly precise data demodulation is possible.

The transmitter SD includes an error correction coder ECA for adding an error correction code onto transmission data, a modulator MOD for modulating the transmission data, and a spread-spectrum modulator SSM for spread-spectrum modulating the modulator output with a spreading code that has been allocated to the channel. The selector SEL2 inputs a transmission signal output by the spread-spectrum modulator SSM to any input terminal of the transmission beam former TBF (see FIG. 1) in accordance with an indication from the selection controller CNT. An amplifier AMP has a gain of $\alpha/4$ (where $\alpha>1$).

(b) Operation

The transmission beam former TBF (see FIG. 1) has a plurality of input terminals conforming to the directions of a transmission beam. That is, if a transmission signal is input to an ith input terminal, the transmission array antenna $AAT_2$ outputs the transmission signal in the beam direction corresponding to the ith input terminal. Further, if transmission signals are input to all input terminals of the transmission beam former TBF, the transmission array antenna $ATT_2$ outputs the transmission signals non-directionally. Furthermore, since a user (mobile station) exists in the beam direction for which the reception signal is largest, gain can be raised and transmission quality improved if the transmission beam is output in the same direction as that of the uplink reception beam having maximum power.

Thus, the selection controller CNT controls the selector SEL2 such that (1) if downlink beam forming is carried out, a transmission signal is input to the input terminal of the transmission beam former TBF that corresponds to the direction of the reception beam having maximum power, and (2) if non-directional transmission is carried out without performing downlink beam forming, transmission signal power is input to each of the input terminals of the transmission beam former TBF by splitting the signal power into n branches (n=4 in FIG. 2) the power of each of which is 1/n to make the total transmission power the same. In this case, if the transmission signal power of the branched signal is made $\alpha/n$ ($\alpha>1$) and the transmission signal power is enlarged, then transmission quality can be improved. The reason is that downlink transmission quality declines unless downlink beam forming is carried out, though the decline can be compensated for by increasing the downlink transmission power a certain extent. If the transmission power of a certain channel is increased, however, the interference imposed upon other channels increases as well. There is a limit, therefore, upon the amount by which power can be increased.

Thus, the selection controller CNT senses whether an uplink reception signal is present or not. If an uplink signal does exist, the selection controller CNT senses the beam (despread signal) having the largest power and inputs this to the selectors SEL1, SEL2. In response, the selector SELL selects the despread signal of maximum power and the reception data identification unit RDI uses this despread signal to identify and output the reception data. The selector SEL2 inputs the output of the transmitter SD to the input terminal of the transmission beam former TBF that corresponds to the direction of the reception beam of maximum power. As a result, a transmission signal (transmission beam) is emitted from the array antenna $ATT_2$ in a direction identical with that of the uplink reception beam.

On the other hand, if the uplink reception signal is not present continuously in excess of a prescribed period of time, the direction in which the mobile station (user) resides is unknown. Accordingly, the selection controller CNT instructs the selector SEL2 to perform non-directional transmission. In response, the selector SEL2 branches the output signal of the transmitted SD four times via the amplifier AMP whose gain is $\alpha/4$ and inputs the resulting signals to all input terminals of the transmission beam former TBF. As a result, in a case where transmission data in the downlink direction exists when there is no uplink reception signal, transmission signals are emitted from the array antenna $ATT_2$ non-directionally.

(c) Selection Controller (c-1) First Embodiment of Selection Controller

Figure 5:
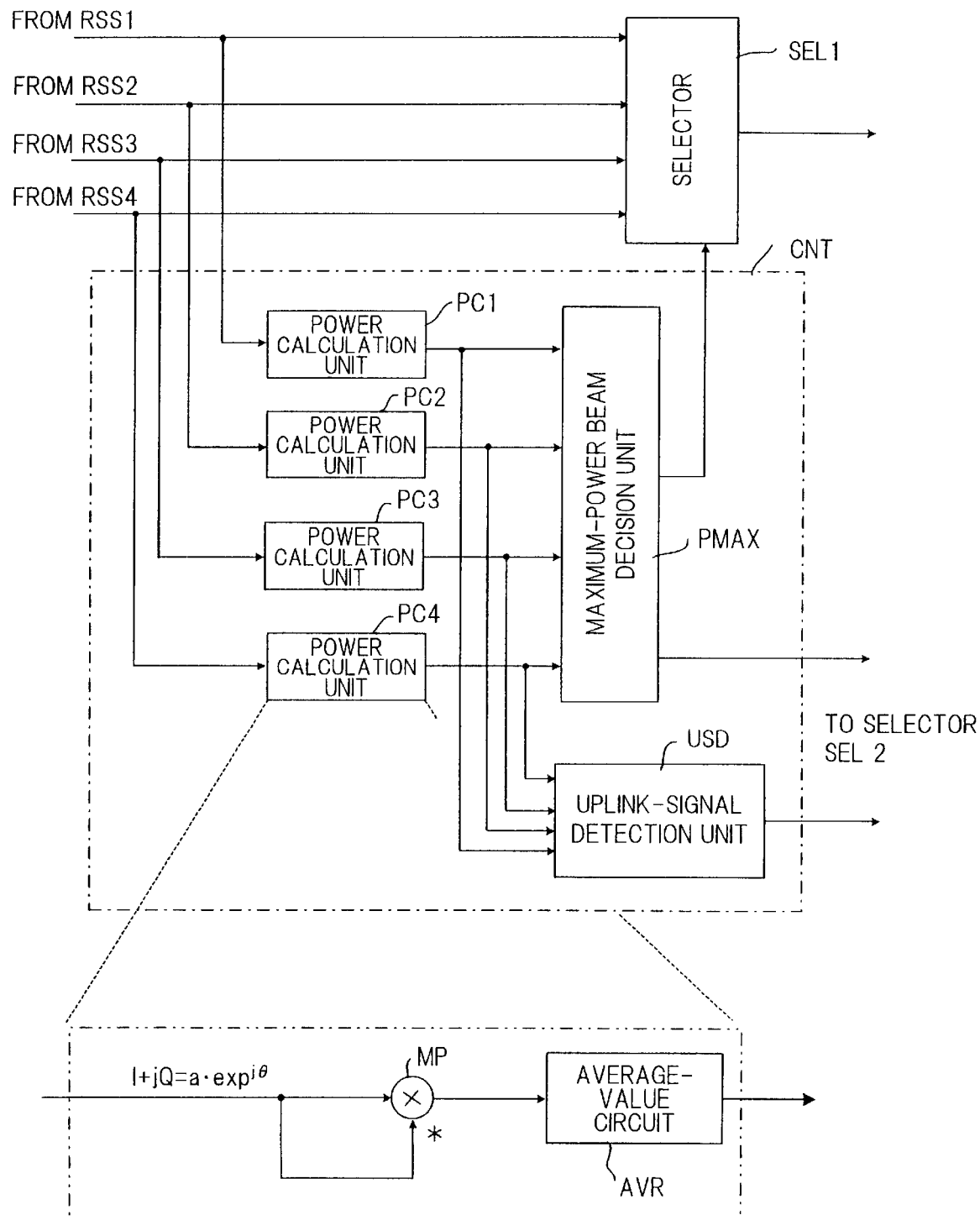
FIG. 5 is a block diagram showing the construction of a first selection controller.

FIG. 5 is a block diagram showing a first construction of the selection controller CNT, which is connected to the selector SELL. The selection controller CNT includes power calculation units PC1–PC4 for calculating the powers of the despread signals output by the despreading circuits RSS1–RSS4, a maximum-power beam decision unit PMAX for determining the beam (despread signal) having maximum power and inputting a signal indicative thereof to the selectors SEL1, SEL2, and an uplink-signal detection unit USD for detecting that an uplink reception signal has been absent continuously for a predetermined period of time or longer. The uplink-signal detection unit USD judges that an uplink signal is absent if the powers of all beams (despread signals) remain below a set value continuously in excess of a predetermined time Ts. If the power of any beam (despread signal) equals or exceeds the set value, the uplink-signal detection unit USD judges that an uplink signal is present.

Strictly speaking, the time Ts is that required for the mobile station to move from the present beam area to another beam area. Downlink beam forming is carried out if an uplink signal is absent upon elapse of the time Ts (measured in seconds) from the moment the uplink reception signal stopped arriving. The time required for the average amount of change in the reception signal in the arrival direction due to movement of the mobile station to exceed an allowable range $\Delta\theta$ can be used as the time Ts. This is decided by the traveling velocity of the mobile station and the distance from the base station. The following equation gives the time Ts [s] required for the arrival angle to change by the allowable range $\Delta\theta$ in a case where a mobile station located at a distance r (measured in meters) from the base station has traveled at a velocity v [km/h] in the tangential direction:

$$Ts=3.6r\pi\Delta\theta/180v$$

For example, Ts=118 ms holds if v=80 km/h, r=50 m, $\Delta\theta=3°$ hold true. However, it is obvious from the above-cited equation that time Ts varies depending upon the velocity of the mobile station, distance from the base station and traveling direction. The time Ts, therefore, cannot be decided rigidly but is instead set to an appropriate time.

The I signals (in-phase signals) and Q signals (quadrature signals) that have been obtained by despreading enter the power calculating units PC1–PC4 from the despreading circuits RSS1–RSS4. When the I, Q signals are expressed in the I-Q complex plane, we have $I+jQ=(I^2+Q^2)^{1/2}\exp(j\theta)$. Accordingly, each of the power calculation units PC1–PC4 multiplies (I+jQ) by its complex conjugate (I–jQ) using a multiplier MP and then averages the products using an average-value circuit AVR to thereby calculate the power $(I^2+Q^2)$, which is then input to the maximum-power beam decision unit PMAX.

It is stated above that an uplink signal is judged to be absent when the powers of all beams (despread signals) are less than a set value continuously for a time greater than the predetermined time period Ts. However, control can be performed in such a manner that when an error detection quantity in the error correction unit ECC (see FIG. 2) exceeds a set value, downlink beam forming is halted on the grounds that the mobile station has moved to another beam area.

(c-2) Second Embodiment of Selection Controller

Figure 6:
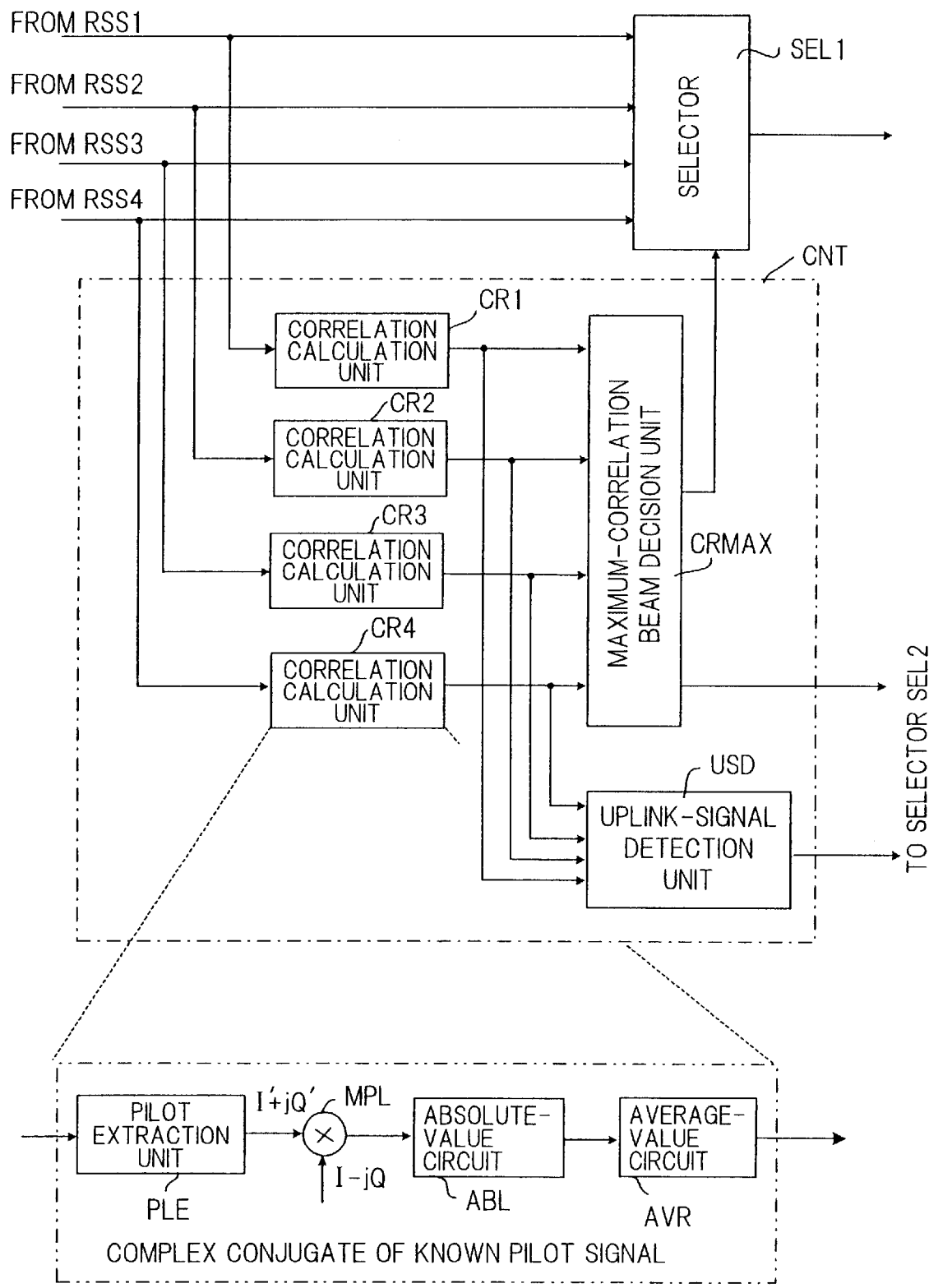
FIG. 6 is a block diagram showing the construction of a second selection controller.

FIG. 6 is a block diagram showing a second construction of the selection controller CNT, which is connected to the selector SEL1. The selection controller CNT has correlation calculating units CR1–CR4 for calculating cross-correlation powers (cross-correlation values) between pilot signals, which are included in the despread signals output by the despreading circuits RSS1–RSS4, a maximum correlation beam decision unit CRMAX for determining the beam (despread signal) having the largest cross-correlation power and inputting a signal indicative thereof to the selectors SEL1, SEL2, and an uplink-signal detection unit USD for detecting that an uplink reception signal has been absent continuously for a predetermined period of time or longer. The uplink-signal detection unit USD judges that an uplink signal is absent if the cross-correlation powers of all beams (despread signals) remain below a set value continuously in excess of a predetermined time. If the cross-correlation power of any beam (despread signal) equals or exceeds the set value, the uplink-signal detection unit USD judges that an uplink signal is present.

In an array antenna system, the phase of a pilot symbol included in that beam in the direction in which the mobile station 12 resides among the beams output by the reception beam former RBF is closest to the phase of the already known pilot symbol and the cross-correlation power of both pilot symbols is the largest. Accordingly, each of the correlation calculation units CR1–CR4 extracts a reception pilot symbol (I'+jQ') using a pilot extraction unit PLE, multiplies this reception pilot symbol (I'+jQ') by the complex conjugate (I–jQ) of the known pilot symbol using a multiplier MPL to calculate the correlation, then calculates the absolute value of the product using an absolute-value circuit ABL and calculates the average using an average-value circuit AVR. Thus, the correlation calculation units CR1–CR4 calculate the cross-correlation powers and input them to the maximum correlation beam decision unit CRMAX. The latter decides the despread signal having the maximum cross-correlation power and notifies the selectors SEL1, SEL2. It should be noted that the beam for which the cross-correlation power of a pilot symbol is maximum naturally exhibits the maximum signal power as well, so that results identical with those of the first embodiment are obtained.

(C) Second Embodiment

In the first embodiment, whether or not downlink transmission beam forming is carried out is controlled based upon whether or not there is an uplink reception signal from the mobile station. In the first embodiment, therefore, a transmission cannot be made upon applying beam forming to a downlink signal in a case where there is no uplink reception signal. The second embodiment is so adapted that if information to be transmitted in the uplink direction vanishes during communication, the mobile station halts data transmission but transmits pilot signals at fixed time intervals, whereby the wireless base station applies beam forming to the downlink signal irrespective of the absence or presence of the uplink reception signal.

(a) Mobile Station

Figure 7:
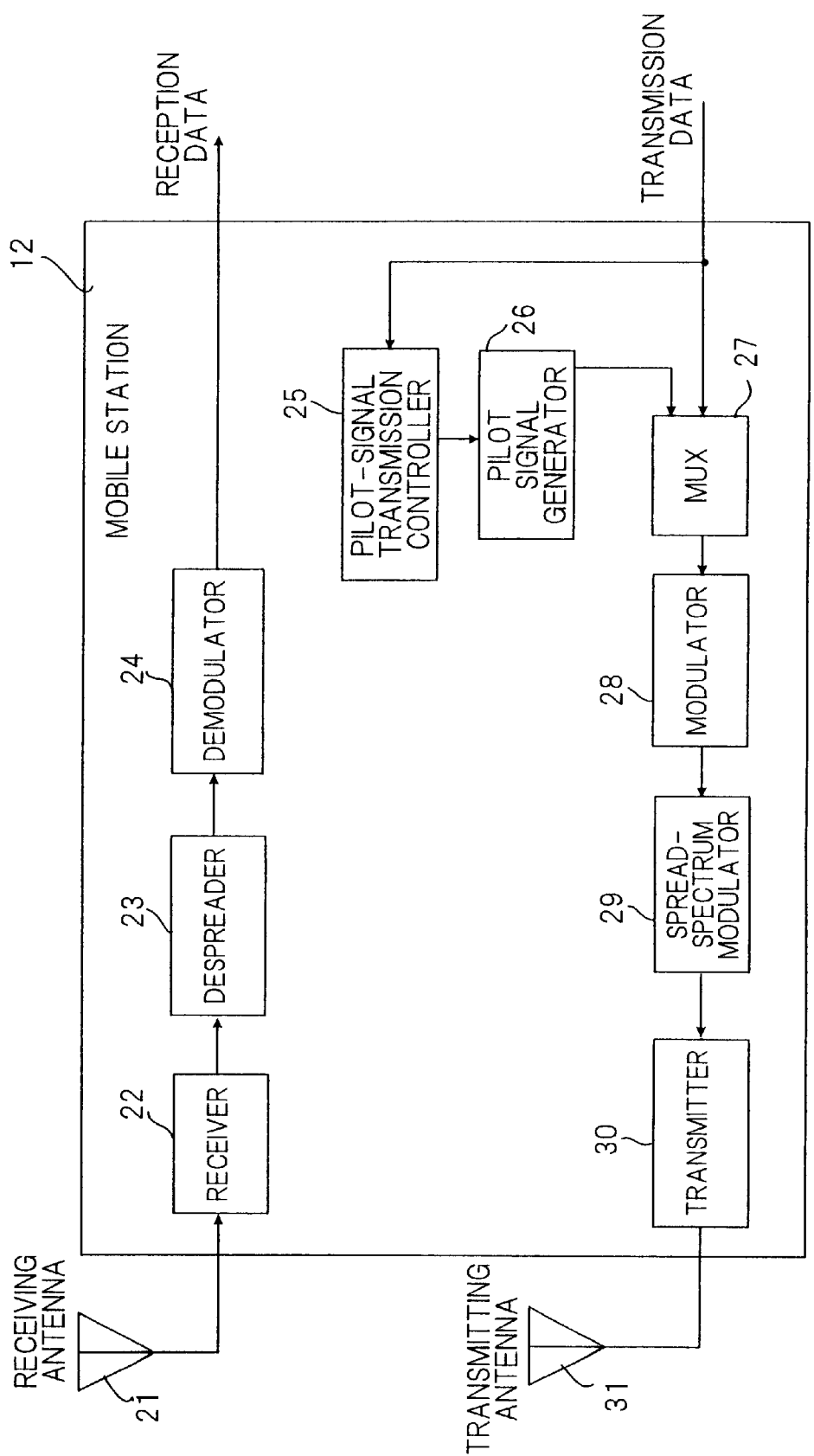
FIG. 7 is a block diagram showing the construction of a mobile station according to a second embodiment to which the present invention has been applied.

FIG. 7 is a block diagram showing the construction of a mobile station according to the second embodiment. The receiving circuitry includes a receiving antenna 21, a receiver 22 for performing high-frequency amplification, frequency conversion and A/D conversion, a despreading unit 23 for despreading a received signal using a spreading code specified by the base station, and a demodulator 24 for subjecting the received data to QPSK demodulation. The transmitting circuitry includes a pilot-signal transmission controller 25 for performing control to insert pilot signals before and after data frames (see FIG. 3), a pilot signal generator 26 for generating a known pilot signal at a timing specified by the pilot-signal transmission controller 25, a multiplexer 27 for inserting a pilot into a data sequence, a modulator 28 for subjecting transmission data output by the multiplexer 27 to QPSK modulation, a spread-spectrum modulator 29 for applying spread-spectrum modulation to the transmission data sequence using a spreading code specified by the base station, a transmitter 30 for subjecting the spread-spectrum modulated signal to frequency conversion and high-frequency amplification, etc., and a transmitting antenna 31.

(b) Operation

If information to be transmitted in the uplink direction vanishes during communication with the wireless base station 11 (FIG. 1) (i.e., in a state in which a connection has been established between the mobile station 12 and the wireless base station 11), the mobile station 12 halts the data transmission. Even in the state in which data transmission has been halted, the pilot-signal transmission controller 25 performs control in such a manner that pilot signals are transmitted at the original transmission period or at a longer period. As a result, the wireless base station 11 carries out downlink beam forming upon judging from the pilot signals that an uplink reception signal is present. It is assumed here that the wireless base station 11 has the arrangement of FIG. 6 as the selection controller CNT.

Thus, regardless of the absence or presence of an uplink reception signal, the wireless base station 11 carries out downlink transmission beam forming to improve the downlink transmission quality. Accordingly, the wireless base station 11 need not carry out transmission beam forming and need not have means for performing non-directional transmission.

(c) First Modification

Figure 8:
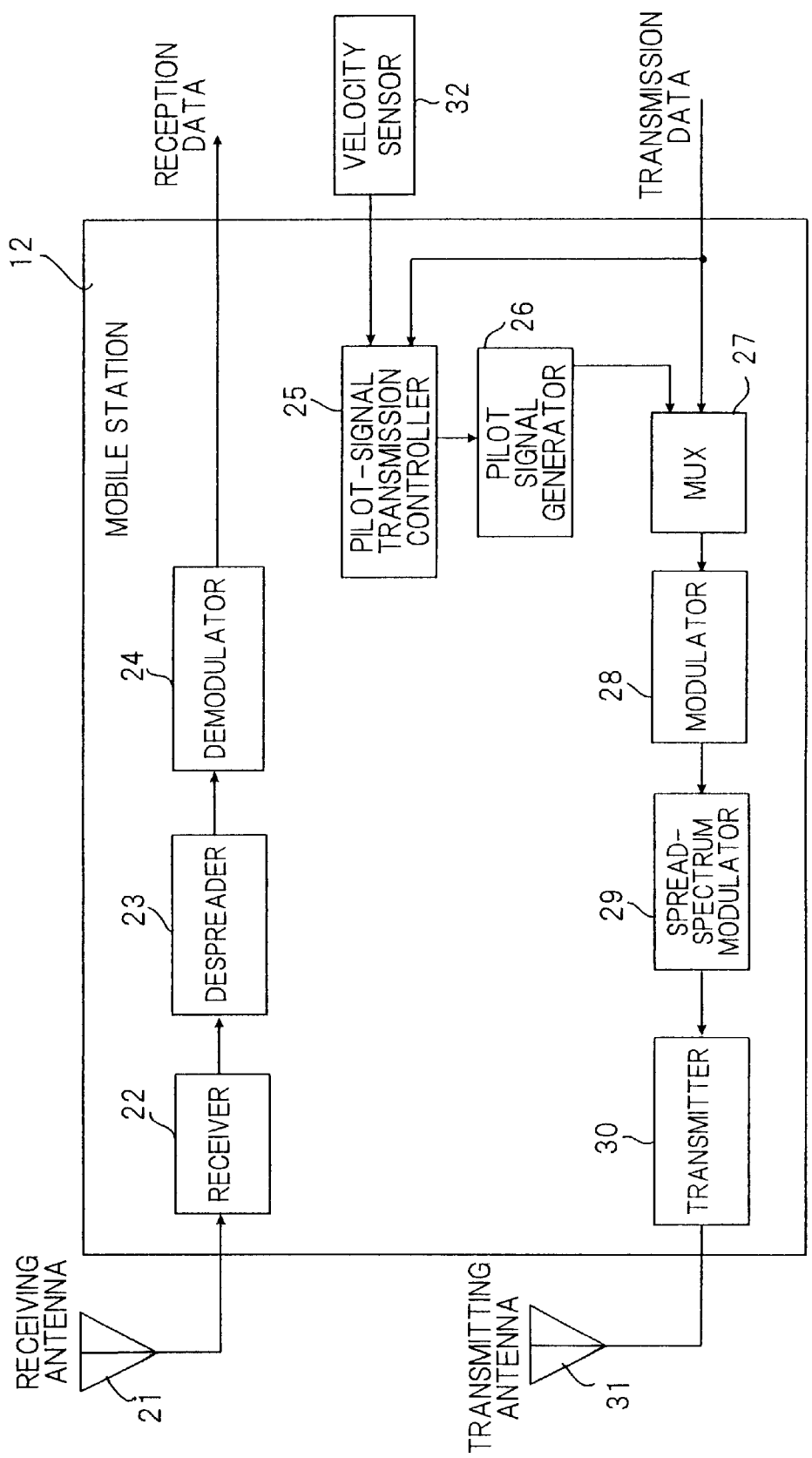
FIG. 8 is a block diagram showing a modification of the mobile station according to the second embodiment.

FIG. 8 is a block diagram showing a modification of the mobile station according to the second embodiment. Components identical with those of the mobile station shown in FIG. 7 are designated by like reference characters. This modification differs in that (1) a velocity sensor 32 for sensing the traveling velocity of the mobile station 12 is provided, and (2) the pilot-signal transmission controller 25, in conformity with the traveling velocity, controls the period at which the pilots are transmitted when data transmission has been halted. The time required for the mobile station 12 to leave the present beam area lengthens when the traveling velocity decreases and shortens when the traveling velocity increases. Accordingly, the pilot-signal transmission controller 25 lengthens the pilot signal transmission period if the traveling velocity is low and shortens the pilot signal transmission period if the traveling velocity is high.

By thus varying the pilot signal transmission interval of the mobile station 12 in dependence upon the traveling velocity of the mobile station, the uplink pilot signal can be transmitted less frequently in a case where the mobile station is at rest or traveling at low velocity.

(d) Second Modification

Figure 9:
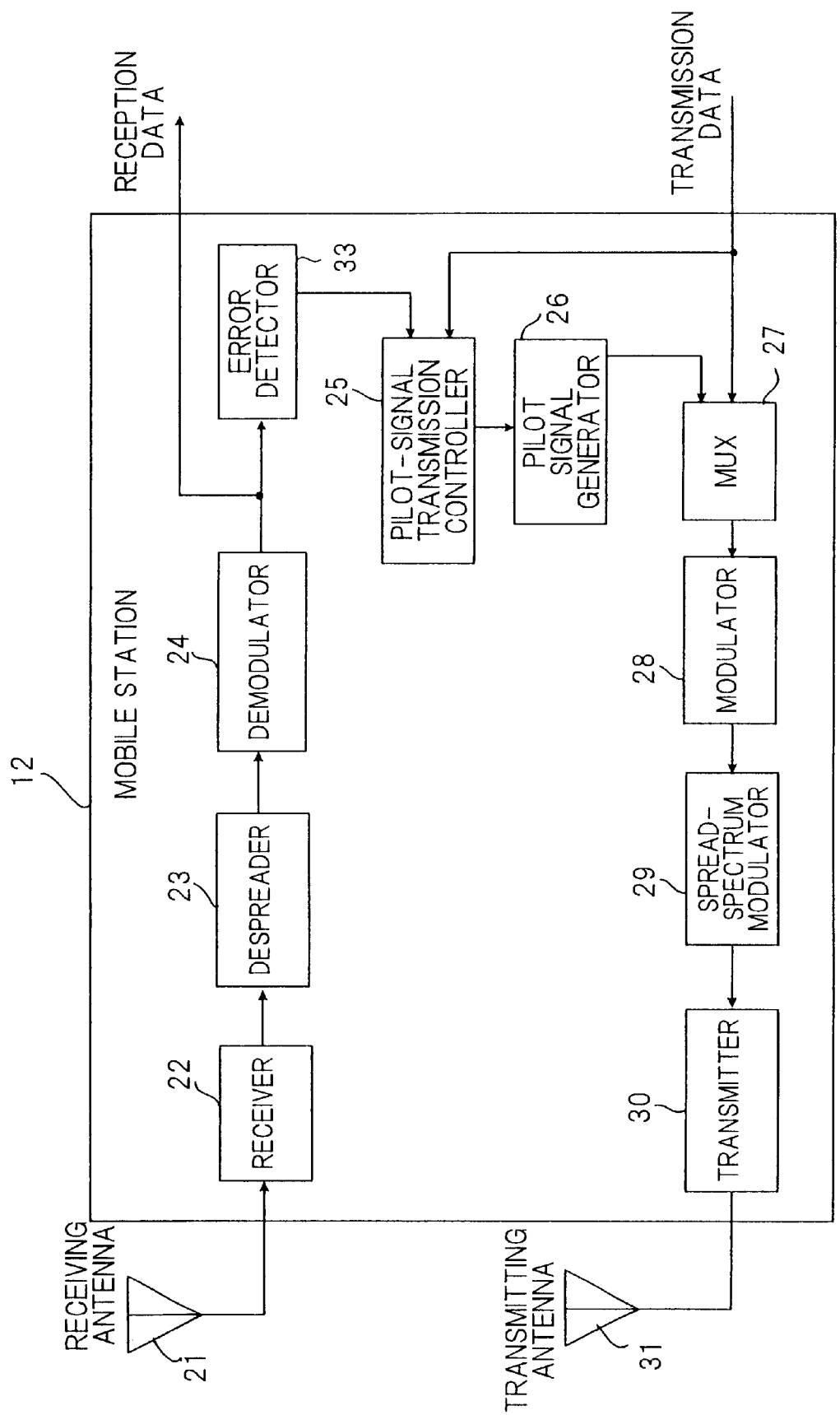
FIG. 9 is a block diagram showing another modification of the mobile station according to the second embodiment.
Figure 10:
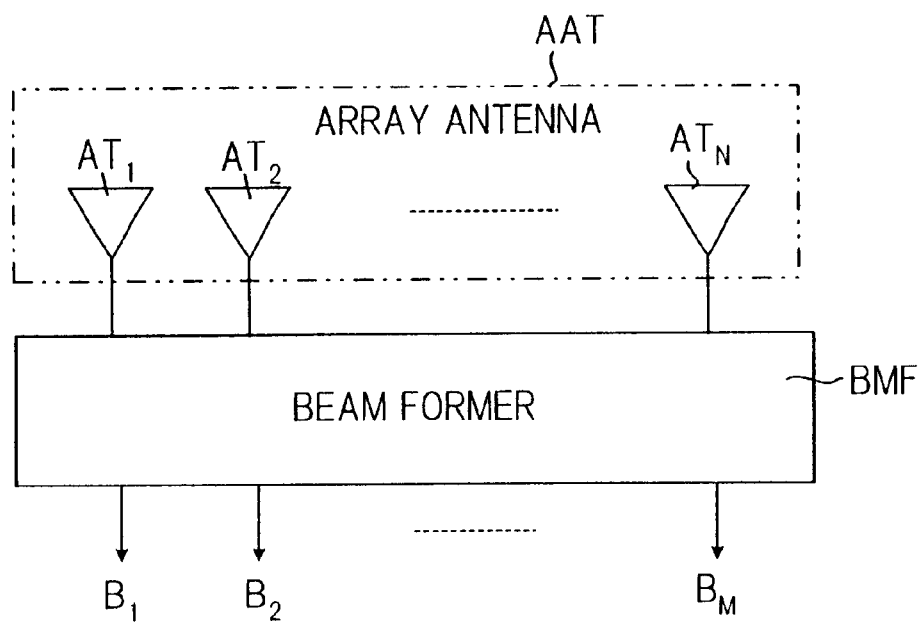
FIG. 10 is a diagram useful in describing a multiple-beam antenna according to the prior art.
Figure 11:
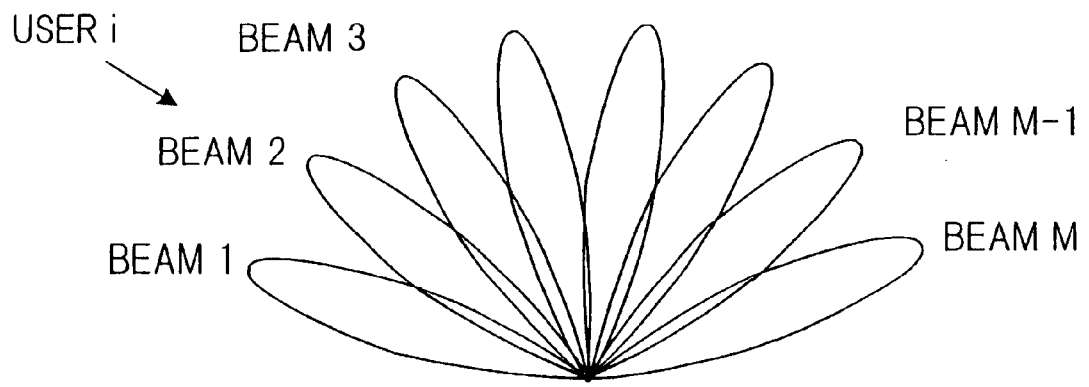
FIG. 11 is a diagram showing the disposition of multiple beams according to the prior art.
Figure 12:
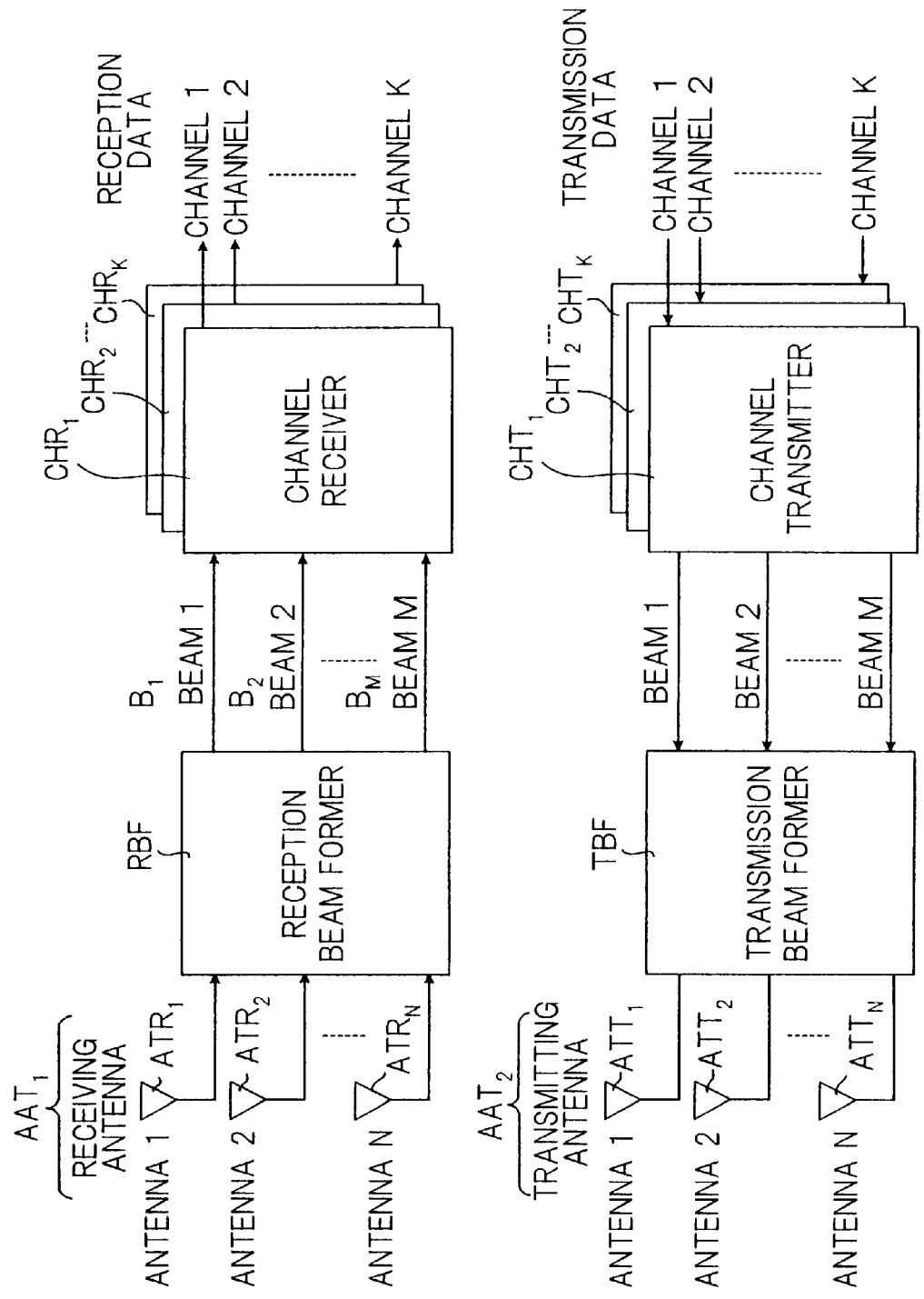
FIG. 12 is a diagram showing the construction of a base station using a transceiving multiple-beam antenna according to the prior art.
Figure 13:
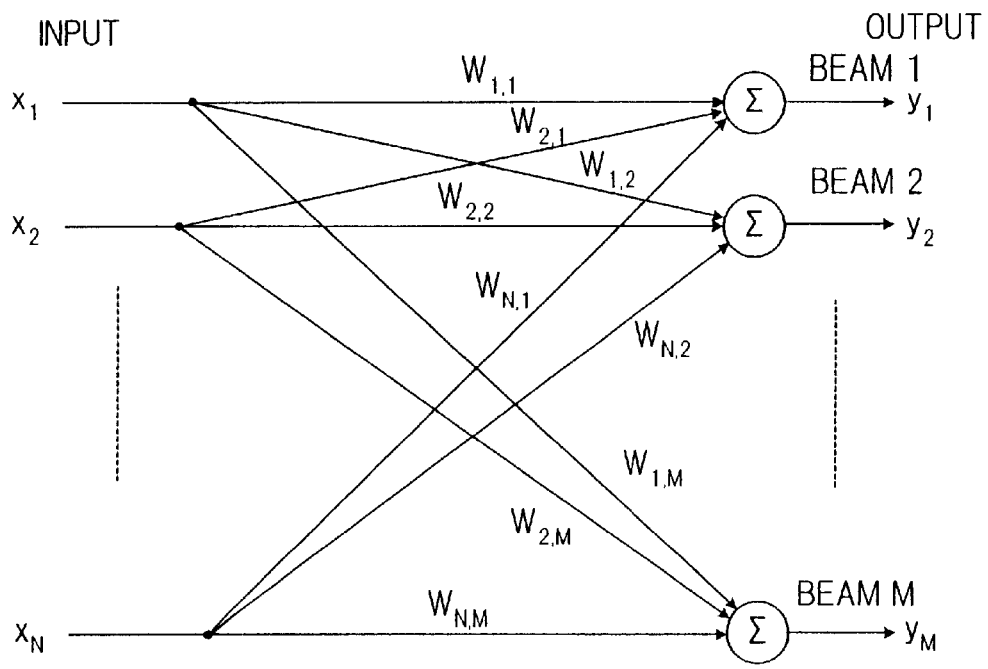
FIG. 13 is a diagram showing the configuration of a reception beam former according to the prior art.
Figure 14:
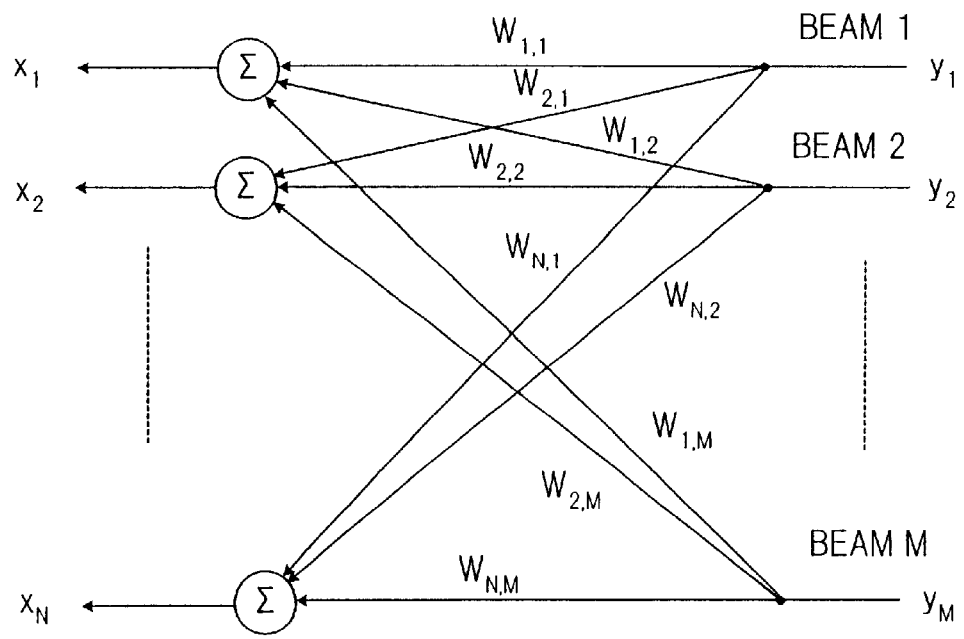
FIG. 14 is a diagram showing the configuration of a transmission beam former according to the prior art.
Figure 15:
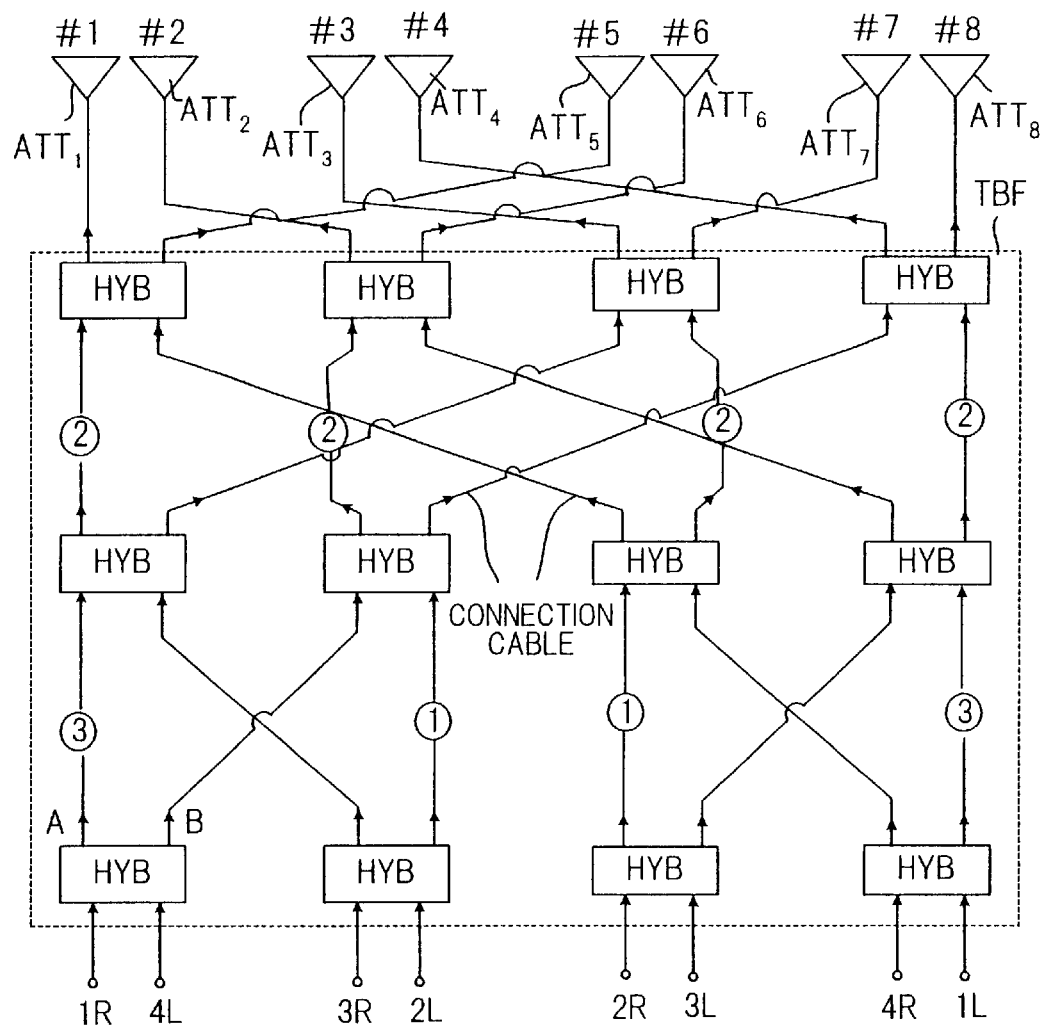
FIG. 15 is a diagram showing the construction of a Butler matrix (in the case of an 8-beam antenna) according to the prior art.
Figure 16:
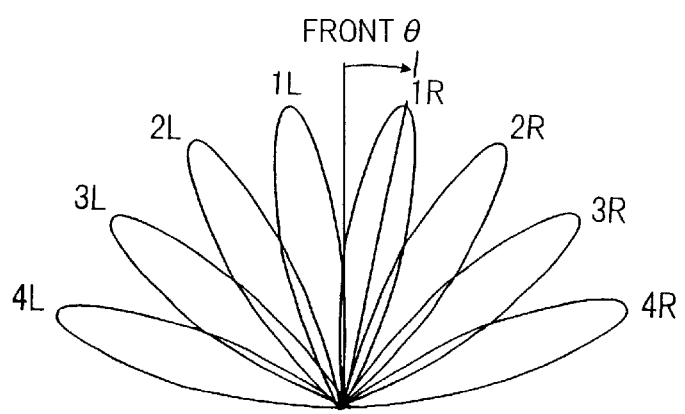
FIG. 16 is a diagram of multiple beams in accordance with the Butler matrix.
Figure 17:
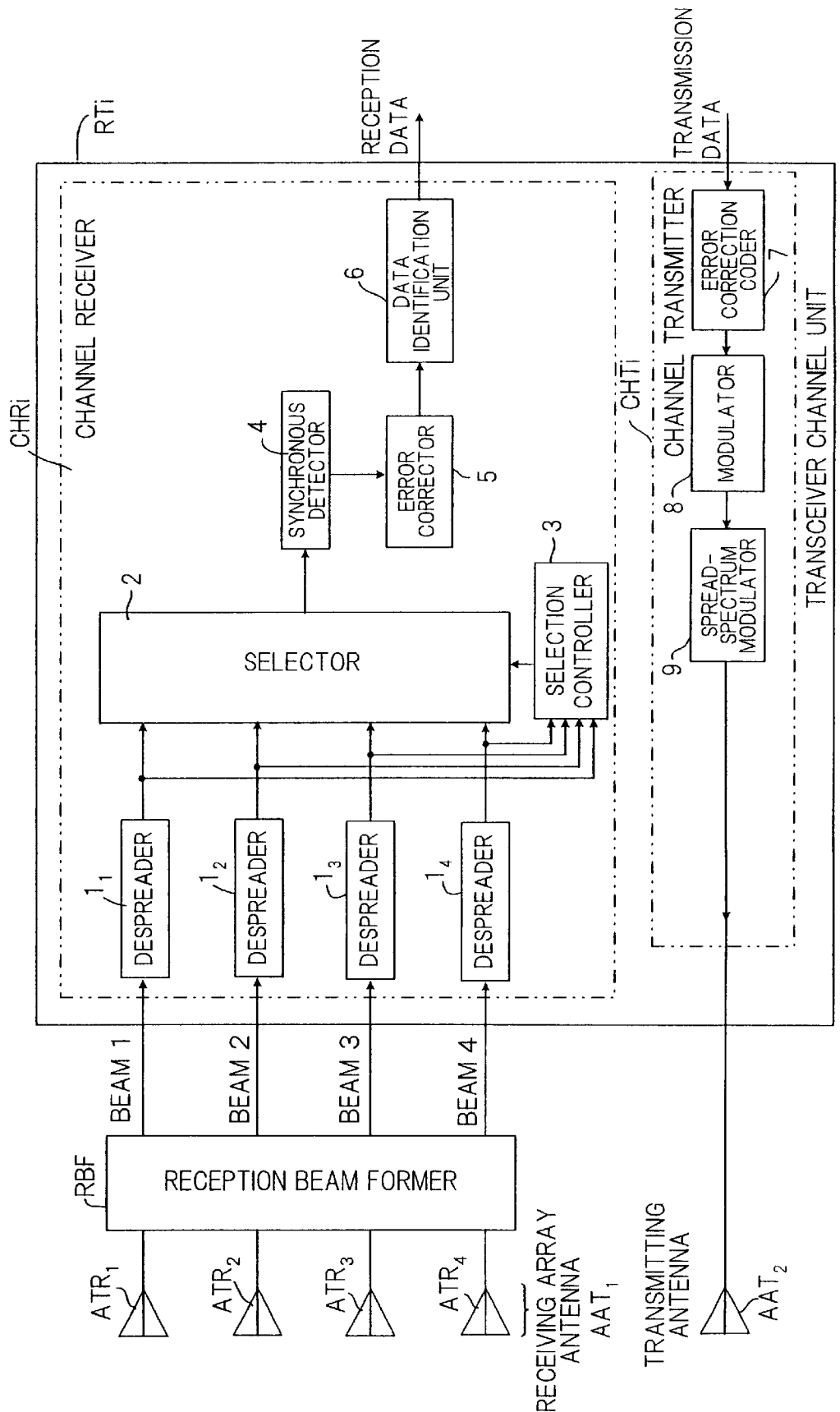
FIG. 17 is a block diagram showing a base-station transceiver channel unit according to the prior art.

FIG. 9 is a block diagram showing another modification of the mobile station according to the second embodiment. Components identical with those of the mobile station shown in FIG. 7 are designated by like reference characters. This modification differs in that (1) an error detector 33 for detecting CRC error, for example, is provided on the output side of the demodulator 24; (2) error detection rate or number of times errors are detected is input from the error detector 33 to the pilot-signal transmission controller 25; (3) the pilot-signal transmission controller 25 halts pilot transmission if data transmission is halted; and (4) if the error detection rate of received data exceeds a set value in a state in which data transmission has been halted, the pilot-signal transmission controller 25 transmits pilot signals in such a manner that the error detection rate is improved. It is assumed here that the wireless base station 11 has the arrangement of the first embodiment, in which whether downlink beam forming is to be carried out or not is controlled based upon the absence or presence of an uplink reception signal, and that the arrangement of FIG. 6 is used as the selection controller CNT.

If the mobile station 12 is transmitting data, the pilot-signal transmission controller 25 inserts pilot signals before and after data frames and transmits the result. If uplink data to be transmitted vanishes and data transmission stops, however, the pilot-signal transmission controller 25 halts the transmission of the pilot signals. As a result, the wireless base station 11 senses absence of the uplink reception signal for a period of time greater than a predetermined period of time.

When the wireless base station 11 senses absence of the uplink reception signal for a period of time greater than the predetermined period of time, the base station does not carry out downlink beam forming and transmits a downlink signal non-directionally. As a consequence, gain declines, interference from other channels increases and the number of times error is detected in the mobile station 12 increases. As a result, the error detection rate reported to the pilot-signal transmission controller 25 by the error detector 33 surpasses the set value.

When the error detection rate exceeds the set value, the pilot-signal transmission controller 25 transmits the pilot signals at a predetermined period. As a result, the wireless base station 11 detects the beam of maximum power based upon the pilot signals, thereby identifying the beam direction in which the mobile station resides, and carries out downlink beam forming to output a transmission beam in the above-mentioned beam direction. The mobile station 12 is then capable of receiving data correctly, the error detection rate declines and the pilot-signal transmission controller 25 stops transmitting the pilot signals.

(e) Third Modification

In the second modification, the wireless base station 11 controls whether or not downlink beam forming is carried out based upon whether or not a pilot signal (uplink reception signal) is present. However, it is also possible to adopt an arrangement in which the wireless base station 11 carries out downlink beam forming irrespective of the absence or presence of a pilot signal (uplink reception signal). Operation in such case is as described below. It should be noted that the construction of the mobile station is the same as that of the second modification.

If the mobile station 12 is transmitting data, the pilot-signal transmission controller 25 inserts pilot signals before and after data frames and transmits the result. If uplink data to be transmitted vanishes and data transmission stops, however, the pilot-signal transmission controller 25 halts the generation of the pilot signals. As a result, the wireless base station 11 can no longer sense the uplink reception signal. The wireless base station 11 thenceforth outputs the transmission beam by carrying out downlink beam forming in the direction of the beam of maximum power thus far.

When the mobile station 12 travels and leaves the present beam area, the number of times error is detected in the mobile station 12 increases. As a result, the error detection rate reported to the pilot-signal transmission controller 25 by the error detector 33 surpasses the set value. When the error detection rate exceeds the set value, the pilot-signal transmission controller 25 transmits the pilot signals at a predetermined period. As a result, the wireless base station 11 detects the beam of maximum power using the pilot signals, thereby identifying the beam direction in which the mobile station resides, and outputs a transmission beam in the above-mentioned beam direction by downlink beam forming. The result is that the mobile station 12 is capable of receiving data correctly, the error detection rate declines and the pilot-signal transmission controller 25 stops transmitting the pilot signals. The above-described operation is then repeated.

The present invention is such that if an uplink reception signal is present, control is performed so as to carry out downlink beam forming of the corresponding channel. If the uplink reception signal is absent continuously for a fixed period of time, control is performed in such a manner that downlink beam forming is not carried out. As a result, downlink beam forming can be carried out in a case where an uplink signal is present, even at the time of a bursty data transmission such as a packet transmission. This makes it possible to improve downlink transmission quality.

Further, in accordance with the present invention, a transmission is split into n branches and input to each input terminal of a transmission beam former so that downlink beam forming is not carried out. In addition, the transmission power of each branched signal is made $\alpha/n$ ($\alpha/n$, where $\alpha>1$). As a result, a decline in downlink transmission quality can be compensated for even in a case where downlink beam forming is not carried out.

Further, in accordance with the present invention, received data can be reproduced and output using a despread signal corresponding to that uplink reception signal that exhibits maximum power among a plurality of uplink reception signals output by the reception beam former. As a result, channel interference can be reduced, making it possible to achieve communication having excellent transmission quality.

Further, in accordance with the present invention, the directivity direction of a downlink transmission beam is made the same as that of the uplink reception beam for which signal power is largest. Such an arrangement makes it possible to improve transmission quality by reducing channel interference in both uplink and downlink channels.

Further, in accordance with the present invention, pilot signals are transmitted at fixed time intervals even in a case where there is no uplink transmission information on the side of the mobile station. As a result, the wireless base station is capable of improving downlink transmission quality by performing downlink transmission beam forming regardless of the absence or presence of uplink transmission information. In this case, the pilot signal transmission interval of the mobile station is varied in dependence upon the traveling velocity of the mobile station. When the mobile station is at rest or traveling at low velocity, therefore, the frequency of uplink pilot signal transmission can be kept low.

Further, in accordance with the present invention, if the transmission quality of the downlink reception signal declines when uplink data is not being transmitted, the mobile station transmits uplink pilot signals. As a result, the wireless base station is capable of improving downlink transmission quality by carrying out downlink transmission beam forming, regardless of whether uplink transmission information is present or not. In addition, it is possible for the mobile station to transmit the pilot signals less frequently.

As many apparently widely different embodiments of the present invention can be made without departing from the spirit and scope thereof, it is to be understood that the invention is not limited to the specific embodiments thereof except as defined in the appended claims.

What is claimed is:

1. A multiple-beam antenna system of a wireless base station in CDMA mobile communications, comprising:

a reception beam for electrically forming a plurality of uplink reception beams by applying uplink beam forming to signals received by a plurality of antenna elements of an antenna array;

a reception data identification unit for executing reception data identification processing based upon an optimum beam among the plurality of uplink reception beams;

a transmission beam former for generating antenna element input signals by applying downlink beam forming, which is for beam formation in a prescribed direction, to transmission signals; and control means for controlling whether downlink beam forming, which is for forming a downlink transmission beam in a direction identical with that of the optimum uplink reception beam, is performed or not in accordance with that an uplink reception signal is present or not.

2. The system according to claim 1, wherein said control means detects whether an uplink reception signal is present or not, performs control so as to form a downlink transmission beam in a direction identical with that of the optimum uplink reception beam if the uplink reception signal is present, and performs control in such a manner that downlink beam forming is not carried out if an uplink reception signal is absent for a fixed period of time.

3. The system according to claim 2, further comprising:

a despreader for despreading a plurality of uplink beams output by said reception beam former; and a selector for selecting a despread signal of maximum power and inputting the signal to said reception data identification unit;

wherein said control means calculates powers of despread signals, obtains the despread signal of maximum power, reports this to said selector and controls said transmission beam former so as to form a downlink transmission beam in a direction identical with that of the uplink reception beam conforming to the despread signal of maximum power.

4. The system according to claim 2, further comprising:

a despreader for despreading a plurality of uplink beams output by said reception beam former; and a selector for selecting a despread signal of maximum power and inputting the signal to said reception data identification unit;

wherein said control means calculates correlation power between a pilot signal contained in a despread signal and a reference signal, obtains the despread signal for which correlation power is maximum, reports this to said selector and controls said transmission beam former so as to form a downlink transmission beam in a direction identical with that of the uplink reception beam conforming to the despread signal for which correlation power is maximum.

5. The system according to claim 2, wherein said transmission beam former has a plurality of input terminals corresponding to beam directions, and said control means inputs a transmission signal to one of the input terminals of said transmission beam former which corresponds to the direction of the uplink reception beam in a case where a transmission beam is formed in a direction identical with that of the reception beam, and splits the transmission signal into a plurality of branches and inputs each branched signal to a respective one of the input terminals of said transmission beam former in a case where downlink beam forming is not carried out.

6. The system according to claim 5, wherein if downlink beam forming is not carried out, the transmission power of each branched signal is made greater than 1/n of transmission signal power, where n represents the number of branches of the transmission signal.

7. A mobile communications system in which a wireless base station having a multiple-beam antenna system and a mobile station communicate with each other in accordance with a CDMA scheme, wherein said wireless base station includes:

a reception beam former for electrically forming a plurality of uplink reception beams by applying uplink beam forming to signals received by a plurality of antenna elements of an antenna array;

a reception data identification unit for despreading a plurality of uplink reception beams output by said reception beam former, identifying reception data using a despread signal of an uplink reception beam of maximum signal power and outputting this reception data;

a transmission beam former for generating antenna element input signals by applying downlink beam forming, which is for beam formation in a prescribed direction, to transmission signals; and a controller for detecting whether an uplink reception signal is present based upon correlation power between a pilot signal contained in a despread signal and a reference signal, and performing control so as to form a downlink transmission beam in a direction identical with that of the uplink reception beam of maximum signal power if the uplink reception signal is present; and said mobile station includes means for transmitting pilot signals at fixed time intervals if information to be transmitted in the uplink direction vanishes during communication.

8. The system according to claim 7, wherein said mobile station further includes means for varying the pilot signal transmission interval in dependence upon traveling velocity of the mobile station.

9. A mobile communications system in which a wireless base station having a multiple-beam antenna system and a mobile station communicate with each other in accordance with a CDMA scheme, wherein said wireless base station includes:

a reception beam former for electrically forming a plurality of uplink reception beams by applying uplink beam forming to signals received by a plurality of antenna elements of an antenna array;

a receiver for despreading a plurality of uplink beams output by said reception beam former and demodulating reception data using a despread signal of an uplink reception beam of maximum signal power;

a transmission beam former for generating antenna element input signals by applying downlink beam forming, which is for beam formation in a prescribed direction, to transmission signals; and a controller for detecting whether an uplink reception signal is present based upon correlation power between a pilot signal contained in a despread signal and a reference signal, performing control so as to form a downlink transmission beam in a direction identical with that of the uplink reception beam of maximum signal power if the uplink reception signal is present, and performing control in such a manner that downlink beam forming will not be carried out if an uplink reception signal is absent for a fixed period of time; and said mobile station includes:

transmission quality monitoring means for sensing transmission quality of a downlink reception signal in a period in which data transmission has stopped; and means for transmitting uplink pilot signals when a decline in transmission quality has been sensed.

10. A mobile station for a CDMA mobile communication system, comprising:

transmission quality monitoring means for sensing transmission quality of a downlink reception signal in a period in which data transmission has stopped; and means for transmitting uplink pilot signals in a period in which data transmission has stopped when a decline in transmission quality has been sensed.

11. The mobile station according to claim 10, which further includes means for varying a pilot signal transmission interval in dependence upon traveling velocity of the mobile station.

12. The mobile station of claim 11, which further includes means for sensing the traveling velocity of the mobile station.

* * * * *